March 31, 1970      L. L. DURR      3,503,878
DRY CLEANING FLUID CONDITIONING PROCESS
Filed May 4, 1966      3 Sheets-Sheet 1
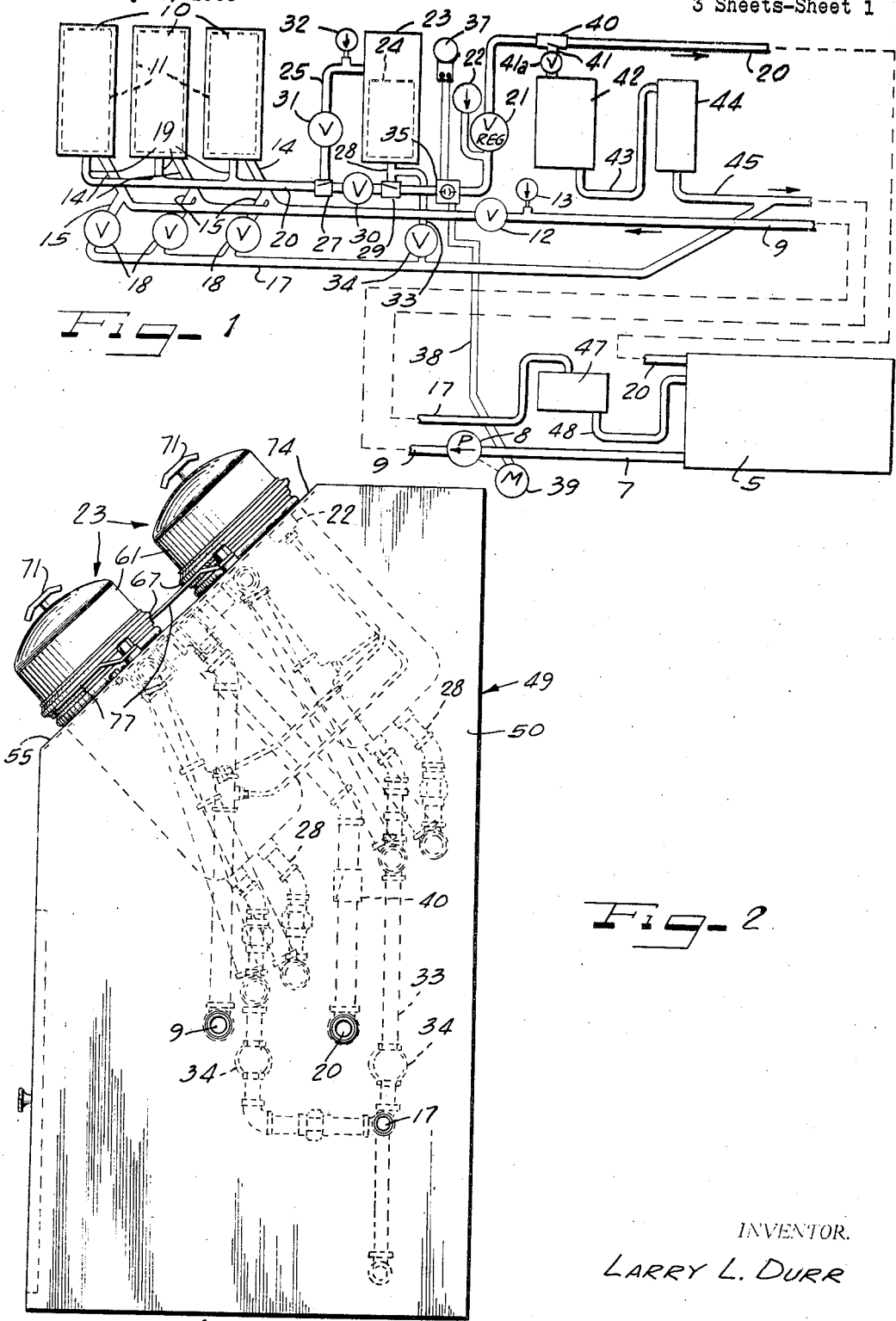
INVENTOR.
LARRY L. DURR
BY *Hill, Sherman, Meroni, Gross & Simpson* ATTORNEYS

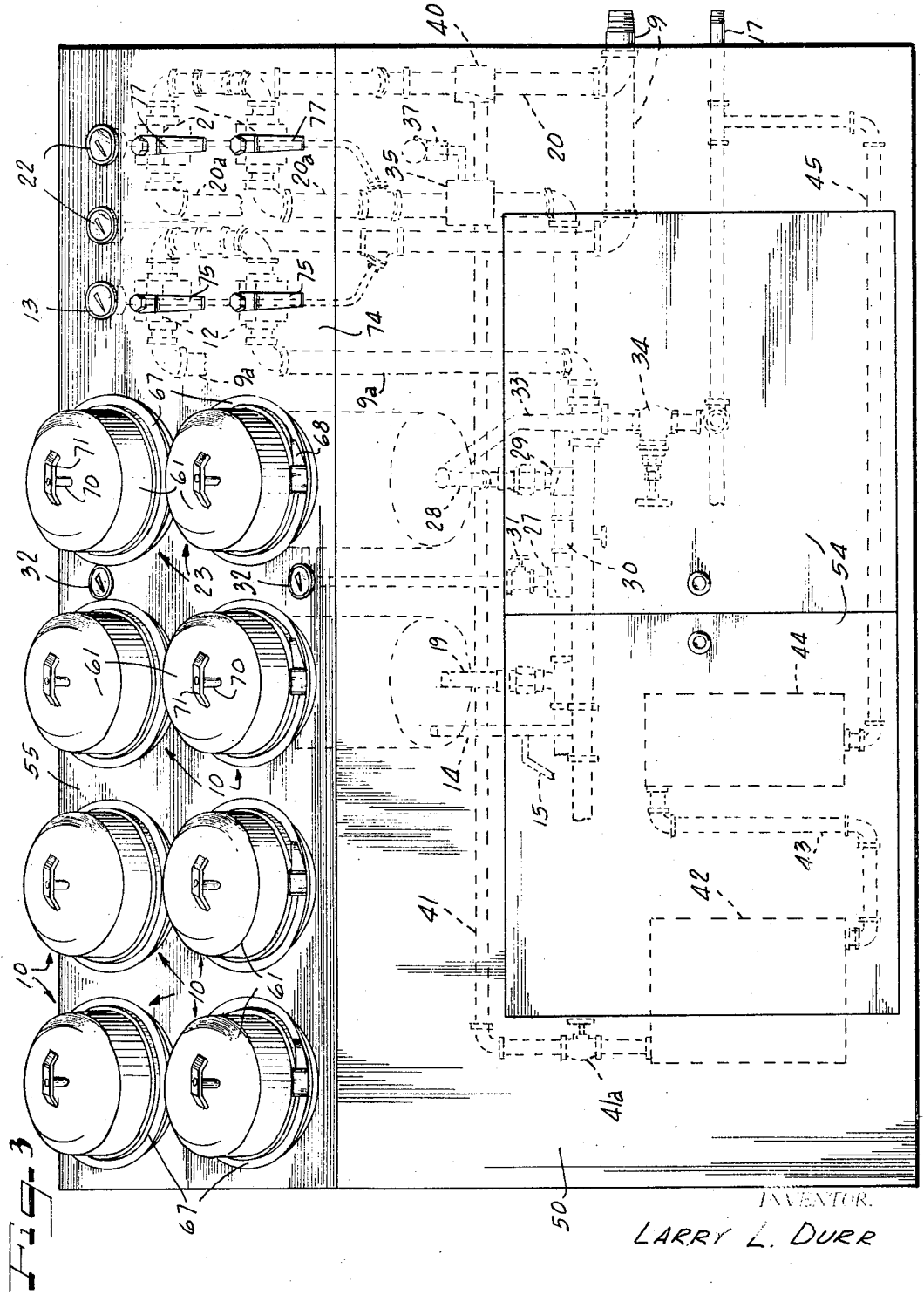

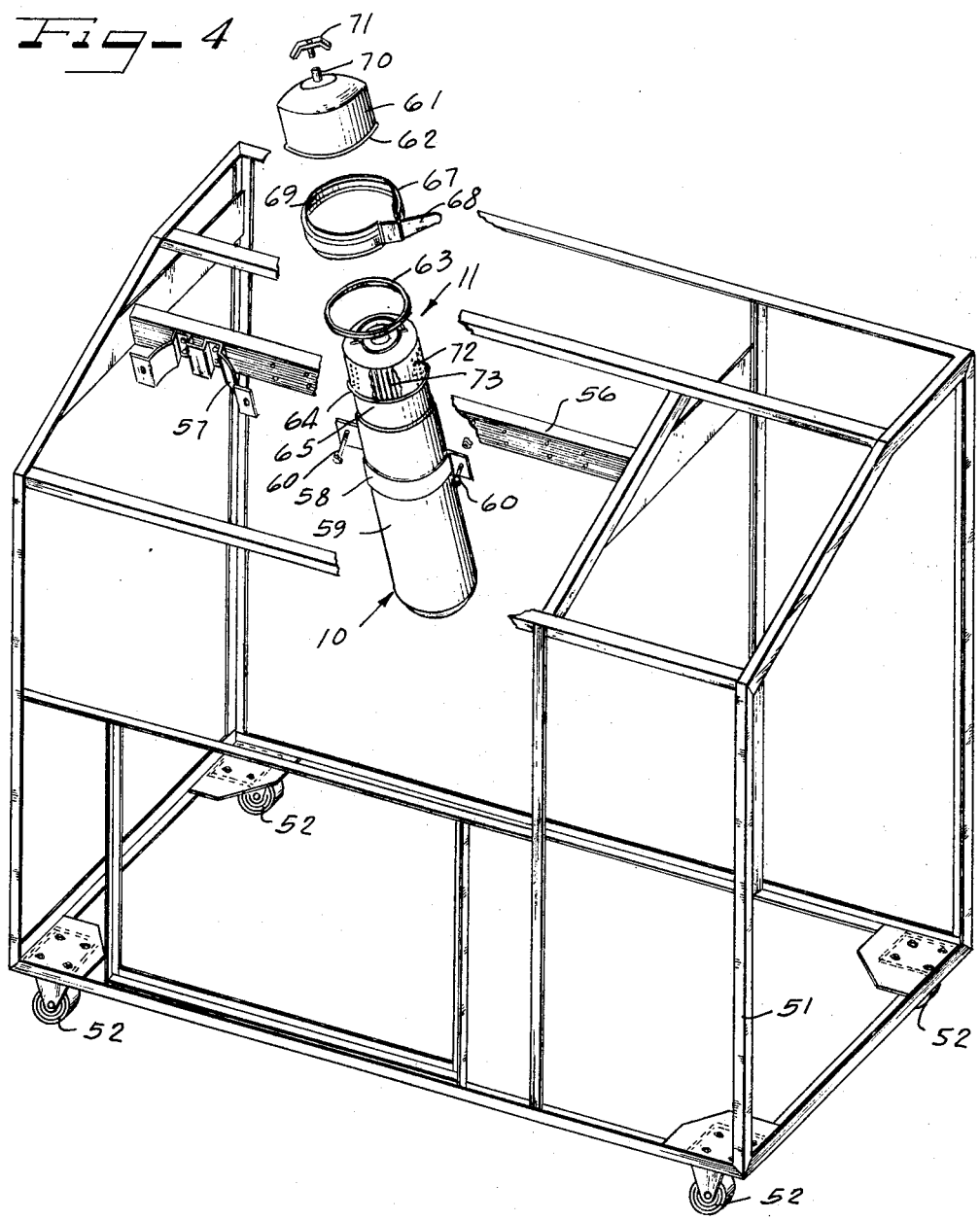

United States Patent Office 3,503,878
Patented Mar. 31, 1970

3,503,878
DRY CLEANING FLUID CONDITIONING PROCESS
Larry L. Durr, Lebanon, Ind., assignor, by mesne assignments, to The Carborundum Company, Niagara Falls, N.Y., a corporation of Delaware
Filed May 4, 1966, Ser. No. 547,564
Int. Cl. B01d *15/06*
U.S. Cl. 210—26                                4 Claims

ABSTRACT OF THE DISCLOSURE

A dry cleaning fluid is circulated through at least one filter tower having a replaceable filter cartridge and back to the dry cleaning machine. The pressure of the fluid downstream of the tower is regulated to maintain constant pressure drop across the filter during its useful life.

---

This invention relates to the conditioning of dry cleaning fluid, and more particularly concerns a new process for continuously conditioning dry cleaning fluid used in a commercial dry cleaning machine.

In the dry cleaning industry various expedients have heretofore been employed for removing soluble and insoluble contaminants from the dry cleaning solvents. Among these expendients have been titration and gravity separation, bag type filters, tube type metal screen filters, distillation, activated carbon absorption, etc. However, the prior expedients, apparatus and methods have involved relatively high operating costs, often less efficiency than desirable, undue shut-down time for replacement of filtering and other conditioning substances, excessive volume of dry cleaning solvent fluid, over large apparatus, and the like.

It is, accordingly, an important object of the present invention to provide a new dry cleaning fluid conditioning process affording reduced operating costs, improved dry cleaning efficiency, complete filtration and solvent clarification, greater capacity in limited space, and complete automation.

Another object of the invention is to provide a novel dry cleaning fluid conditioning process which simplifies and expedites servicing in respect to replaceable conditioning components and materials.

A further object of the invention is to provide a new dry cleaning fluid conditioning process utilizing replaceable filtering cartridges and separate replaceable activated carbon tower means.

Another object of the invention is to provide a novel dry cleaning fluid condition process utilizing replaceable pleated paper cartridges and providing increased efficiency and substantial increase in cartridge service life.

Yet another object of the invention is to provide a novel dry cleaning fluid conditioning process utilizing activated carbon and affording improved efficiency and economy through continuous observation of the clarity of the fluid after passing through the carbon so that replacement of the carbon is effected neither sooner nor later than desirable.

Other objects, features and advantages of the present invention will be readily apparent from the following detained description of a preferred embodiment thereof taken in conjunction with the accompanying drawings, in which:

FIGURE 1 is a schematic illustration of a dry cleaning fluid conditioning system embodying the principles of the present invention;

FIGURE 2 is a side elevational view of a cabinet unit containing apparatus of the system;

FIGURE 3 is a front elevational view of the cabinet unit; and

FIGURE 4 is an isometric illustration of the frame structure of the cabinet and shows one of the filtration towers in exploded assembly.

In practicing the method of the present invention, dry cleaning fluid which has been used in a dry cleaning machine 5 (FIG. 1) of any preferred variety such as of the basket or wash wheel type, is circulated through a purifying cycle which is desirably continuous while the machine is in operation. This cycle comprises circulating dry cleaning fluid from the machine 5 through filtering, and other conditioning steps and return to the machine for reuse.

Used, contaminated dry cleaning solvent fluid is drawn off through a conduit 7 by operation of a circulating pump 8 which may be controlled to operate concurrently with the machine. From the pump the fluid to be conditioned is driven through a delivery or inlet conduit 9 to filtering means including at least one and preferably a plurality of filtration towers 10 in each of which is a disposable, replaceable filter cartridge 11, desirably of the resin-coated, pleated paper type. Ahead of or upstream from the filtration towers 10 the passage provided by the conduit 9 has a shutoff or gate valve 12 by which pump pressure to the towers can be selectively discontinued when it is desired to replace the cartridges. Pumping pressure is adapted to be visualized by means of a pressure gage 13 desirably located in the conduit 9 upstream adjacent to the valve 12. Preferably the filtration towers 10 are in parallel flow relationship and a separate delivery branch 14 connects each of the respective towers with the delivery conduit 9. For cartridge replacement, it is desirable to at least partially drain the containers of the towers, and for this purpose suitable drain ducts 15 are connected with the towers, as by connection with the delivery branches 14 and leading to a drain conduit 17. Desirably, respectively shutoff valves 18 are in control of the drain ducts 15. There may be as many of the filtration towers 10 as desirable for servicing the machine 5 calculated on the desired or necessary capacity of the machine, filtration capacity of the filters 11, and the like. Filtrate passes from the respective filtration towers 10 by the way of respective takeoff branch ducts 19 into a return passage provided by a conduit 20 by which the filtrate is returned preferably directly to the machine 5 for reuse. In order to substantially control pressure drop across the disposable cartridges 11 and thus avoid channeling of the cartridge pleats or undesirable impregnation of the filter paper, a variable setting regulation valve 21 desirably controls flow through the return conduit 20 at a desirable location downstream from the filtration towers. Thereby cartridge life is substantially improved. The valve 21 is of a type that can be readily adjusted to maintain a substantially balanced pressure differential condition across the filter cartridges. The term "balanced pressure" as used in the specification and claims means that the pressure differential across the cartridges remains substantially constant throughout the cartridge life. For convenient visualization of the regulated pressure, a pressure gage 22 is desirably connected to the return conduit 20 upstream adjacent the valve 21.

In order to neutralize dyes and free fatty acids, at least a substantial proportion of the filtered dry cleaning fluid is passed through granulated activated carbon. For this purpose, a carbon tower 23 is located downstream from the filtration towers 10 and is operatively connected with the return conduit 20. Desirably, the carbon tower 23 is constructed and arranged to receive the carbon granules in a replaceable mass 24 conveniently supplied in one or more porous bags of suitable size to fit within the tanklike container of the carbon tower. Fluid to be treated within the carbon tower 23 is diverted from the return conduit 20 through an intake duct 25 with the connection to the conduit 20 being desirably effected through a proportional flow divider 27. Through such connection a predetermined percentage proportion of the filtered fluid is diverted to pass through the carbon tower while the remainder of the filtered fluid may travel on without such treatment since generally conditioning of the fluid will be satisfied with partial carbon treatment of the fluid in each circulation cycle. Return of the carbon-treated increment of the fluid to the return duct 20 is through a discharge duct 28 leading from the carbon tower 23 and communicating with the return duct through a connection preferably comprising an eductor 29 such that the return stream flowing through the conduit 20 will draw the carbon-treated fluid from the carbon tower. Should conditions be such in the dry cleaning cycle as to require all of the filtered fluid to be conditioned by passage through the carbon tower 23, this may be effected by closing a gate valve 30 in the conduit 20 between the flow divider connection 27 and the eductor connection 29 whereby all of the returning fluid will be diverted through the carbon tower. If conditions are such that none of the returning filtered fluid need be treated in the carbon tower 23, or if only a diminished proportion may be treated, a valve 31 in the intake duct 25 may be operated to close or restrict this duct, as desired. For visual indication of the relative pressure in the intake duct 25, a pressure gage 32 may be in communication therewith downstream from the valve 31. Closure of the valve 31 may also be in order when it is desired to open the carbon tower 23 for replacing the carbon 24. At such time, fluid within the carbon tower is adapted to be drained off through a drain duct 33 which may lead from the discharge duct 28 and connect with the drain conduit 17, a closure valve 34 being provided for normally closing the drain duct.

Since for efficient dry cleaning it is desirable that the conditioned fluid be clarified to certain prescribed limits, the fluid is monitored after it leaves the carbon tower 23 and when the color density exceeds a permissible value either a sensible signal is given or the system shut down, or both. To this end, a color detector 35 is mounted across the return conduit 20 downstream from the eductor connection 29. This detector is desirably of the electric eye type which looks across a gap through which the fluid passes and controls a signalling circuit which is activated when the color density reaches a predetermined value indicative of the necessity for replacing the carbon in the tower 23. Operation of the signal desirably activates an alarm which may be either audible or visual, or both, and is represented by the alarm device 37. Alternatively, or simultaneously, the monitor signal may operate through an electrical connection 38 to halt a motor 39 which drives the pump 8. Since the pump and the machine 5 are desirably coordinated, halting of the pump motor may also cause the dry cleaning machine to be stopped. Alternatively, the color monitoring device signal may be utilized to halt the machine 5, which in turn will stop the circulating pump.

Some nonvolatile, soluble contaminants cannot be removed in the filtration and clarification steps in the system, and for this reason it is desirable to distill the dry cleaning fluid at least periodically. Desirably this is accomplished automatically and continuously as a part of the cleansing cycle by periodically or continuously diverting a predetermined portion of the fluid from the return conduit 20 downstream from the carbon tower. To this end, connection is effected with the conduit 20 through a proportional flow divider 40 with a branch duct 41 having therein a selectively operable shutoff valve 41a and communicating in delivery relation with a distillation unit 42 in which the dry cleaning fluid solvent is distilled free from the residual contaminants. Inasmuch as certain odors may carry over in the distillate, the distilled fluid is conducted from the unit 42 through a duct 43 from which it passes through a deodorizing tower 44 carrying a charge of suitable material of which alumina is an example. From the deodorizing tower a leadoff duct 45 connects with the drain conduit 17 by which the deodorized distillate is connected to a fluid makeup supply tank or reservoir 47. Makeup fluid supply is communicated from the reservoir 47 to the machine 5 through a conduit 48.

It will thus be apparent that the system as described affords maximum control of dry cleaning solvent fluid clarification automatically and with continuous efficiency. All phases of clarification are continuously in operation so as to give total clarification with minimum and easily and conveniently effected maintenance.

In furtherance of simplification, compactness, economy of apparatus and space requirements for the apparatus, minimization of installation effort and expense and operating efficiency, all of the apparatus employed in the conditioning system is desirably mounted in substantially unitary relation in a cabinet 49 (FIGS. 2 and 3). This comprises a housing 50 mounted on a frame 51 (FIG. 4) and which is desirably carried on casters 52 so as to be readily portable to be moved into position adjacent to the dry cleaning machine with which it is to be used. For ready access into the cabinet, the frame 51 includes a suitable front doorway 53 mounting access doors 54 in the front of the cabinet. In order to accommodate the filtration towers 10 and the carbon tower 23 conveniently for servicing, the cabinet has an oblique upwardly and rearwardly slanting top portion 55 extending from the front.

Means are provided on the frame 51 within the cabinet adjacent to the top for supporting the towers 10 and 23 on respective axes substantially normal to the plane of the oblique portion 55, and with the upper end portions of the towers located for ready access at the top of the cabinet. Suitable supporting structure comprises a horizontal frame bar 56 carrying attached thereto for each of the towers one-half 57 of a strap clamp while a complementary half 58 of the clamp engages about an upwardly opening tubular tank-like container 59 of the tower assembly, with screws 60 provided to secure the clamp members together and thus secure the container 59 securely in place. For compactness, it will be observed that two rows of the towers are provided in respective lines, with one line mounted on the front of the supporting frame structure bar 56 and the other line mounted on the back of such bar.

By way of example, one of the filtration towers 10 is depicted in FIGURE 4 and it will be understood that insofar as the tower structure or assembly itself is concerned it is the same for both the filtration towers and the carbon towers, with the contents of the towers suitably different. In addition to the container 59, the tower includes a cupped cover 61 having an annular beaded lip 62 which in assembly bears against a sealing gasket 63 arranged to rest upon an upper beaded annular lip 64 about the open end of the container 59 at the terminus of a slightly reduced diameter annular neck 65. Retaining the cap 61 removably in sealed relation on the container 59 is a resiliently flexible split ring clamp 67 including an overcenter lever handle latch 68. As the ring clamp 67 is drawn up about the beads 62 and 64 with the intervening sealing gasket ring 63, substantially annular camming surfaces defined by an intermediate annular inwardly opening groove 69 in the clamping ring cam the beads toward one another into tight sealing engagement with the gasket ring. Through this arrangement opening and closing of the tower assemblies is easily effected. Mounting of the towers is with the cover caps 61 and the retaining clamps 67 accessibly exposed above the top portion 55 of the cabinet.

Suitable ports and connecting means such as nipples and the like are provided on the tower containers 59 for attaching the several ducts thereto. Further, since it is necessary in order to drain the respective towers to let air into the tops thereof, suitable air bleed or vent means are provided including on each of the caps 61 a bleed orifice defined by an upwardly extending and internally threaded short stem 70 into which is threadedly engageable a wing nut closure plug 71 for sealing the orifice when the tower is operative.

Within each of the filtration towers 10, the replaceable cartridge 11 is slidably received in a manner to receive fluid to be filtered through a perforated outer casing 72 of the cartridge for filtration in passing through generally accordion pleated paper filter unit 73. Whenever necessary, the cartridges 11 are readily replaced with fresh cartridges. Since this may occur with greater frequency than the necessity for changing the carbon 24 in the carbon towers 23, substantial economy is effected in the system. It may also be mentioned that by the provision for bulk masses of bagged carbon in the carbon towers, the most economical mode of supplying the carbon is provided for.

To facilitate controlling of the unit, the slanted top portion 55 is provided with an extension at one side of the top affording an instrument panel area 74 mounting the pressure gages 13 and 22. Desirably each of the front and rear rows or banks of towers is connected to a respective branch 9a joined together with the conduit 9 adjacent to the area 74, and each such branch having one of the shutoff valves 12 with a respective operating handle 75 therefor readily accessible above the instrument panel area. Similarly, the return conduit 20 has separate branches 20a associated with the respective rows or banks of towers and joining the main line of the conduit 20 adjacently under the instrument area 74. Each of the branches 20a has one of the regulating valves 21 therein, with a respective operating handle 77 accessible above the instrument panel area. Also, each of the conduit branches 20a has one of the pressure gages 22.

Accommodation for the distillation unit 42 and the deodorizing tower 44 within the space in the cabinet 49 below the several towers enables all of the various ducts and conduits associated therewith to be housed within the cabinet.

Connection of the apparatus housed in the cabinet 49 with the dry cleaning machine 5, the pump 8 and the reservoir 47 is readily effected simply by appropriately connecting to continuations of the conduits 9, 17 and 20, respectively, at one side of the cabinet through outwardly projecting respective terminals on those portions of such conduits as are housed within the cabinet. If desired, the pump 8 and its motor 39 may be housed within the cabinet 49.

It will be understood that modifications and variations may be effected without departing from the scope of the novel concepts of the present invention.

I claim:
1. A method of conditioning dry cleaning fluid comprising:
 (a) circulating contaminated dry cleaning fluid from a dry cleaning machine through at least one filtration tower having a replaceable filtering cartridge therein and back to said machine, and
 (b) regulating the pressure on the downstream side of said tower so as to control pressure drop through and maintain pressure differential across the filtering cartridge substantially constant during the useful life thereof, thereby substantially extending the life of the cartridge.

2. A method in accordance with claim 1 including the steps of passing at least a part of the cleaning fluid leaving the filtration tower through an activated carbon tower before it is recycled back to the dry cleaning machine, and said pressure is regulated downstream of the activated carbon tower.

3. A method in accordance with claim 1 in which dry cleaning fluid after it has passed through the filtration tower is distilled, the distillate returned to the dry cleaning machine and the residual contaminants withdrawn from the process.

4. A method in accordance with claim 3 in which the distillate is deodorized by contact with alumina before being returned to the dry cleaning machine.

References Cited
UNITED STATES PATENTS

| | | | |
|---|---|---|---|
| 2,140,623 | 12/1938 | Hetzer | 202—181 |
| 2,171,197 | 8/1939 | Urbain et al. | 210—27 X |
| 2,294,697 | 9/1942 | Seip | 210—25 |
| 2,323,876 | 7/1943 | Rickett | 210—25 X |
| 2,964,934 | 12/1960 | Shields | 68—18 |
| 3,201,346 | 8/1965 | Benedict | 210—24 |
| 3,203,754 | 8/1965 | Young et al. | 210—167 X |
| 3,231,324 | 1/1966 | Young | 68—18 |
| 3,110,544 | 11/1963 | Moulthrop | 68—18 |
| 3,291,562 | 12/1966 | Anderson | 210—259 X |

SAMIH N. ZAHARNA, Primary Examiner

U.S. Cl. X.R.

210—27, 39, 137, 167, 253